United States Patent Office 3,285,401
Patented Nov. 15, 1966

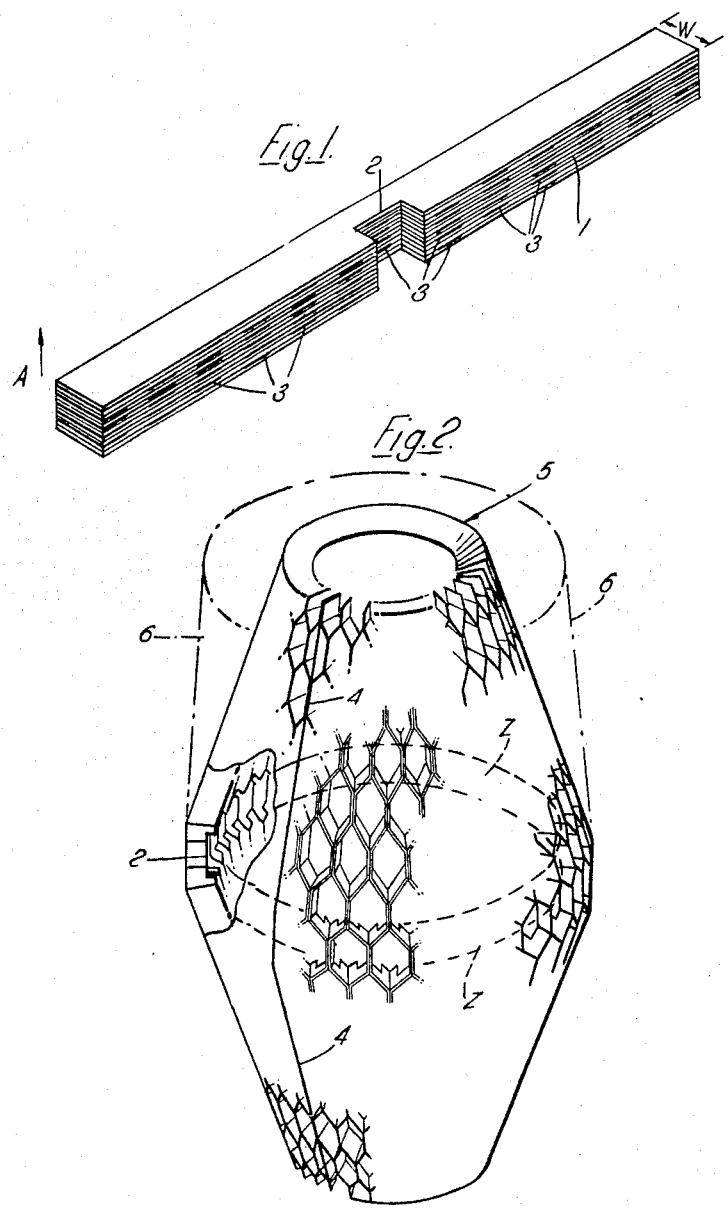

3,285,401
SHOCK PROTECTIVE MATERIAL
George May, Wembley, England, assignor, by mesne assignments, to Hexcel Products Inc., Berkeley, Calif., a corporation of California
Original application Oct. 31, 1962, Ser. No. 234,348. Divided and this application June 28, 1965, Ser. No. 483,384
3 Claims. (Cl. 206—46)

This application is filed as a division of my copending application Serial No. 234,348, filed October 31, 1962, now Patent No. 3,225,509.

The present invention relates to the protection of articles by enveloping them in shock-protective material and has as an object the provision of an improved shock-protective material for this purpose. The invention has as a further object the provision of an improved method of protecting articles by enveloping them.

In accordance with the present invention there is provided a shock-protective material for the protection of an article which comprises a slice of structural honeycomb material formed with one or more notches positioned and dimensioned to permit the slice to be expanded and formed into enveloping relationship with the article. The notch or each notch may be formed by cuttting the slice part-way through its thickness from a face thereof which is formed by edges of the constituent sheet material, using for example a saw or grinding wheel. A plurality of notches when required in the same face may be cut in a single operation by rotary saw blades or grinding wheels mounted on a common axle.

The choice of the slice thickness and type of honeycomb to be employed depends upon circumstances. Honeycomb material may be produced in various mesh-sizes from various sheet materials including metal foil, resinated and non-resinated paper and cardboard, resinated glass fabric and bituminised paper. The choice is well within the skill of the packaging art once the principles of the invention have been appreciated. For most purposes honeycomb material made from thick non-resinated paper or thin cardboard gives satisfactory results at a favourable cost.

It is already known to notch slices of honeycomb material in order to provide apertures for venting the cells when the expanded material is laminated. Such notching is not to be confused with the notching of the present invention; venting notches are of insufficient depth to facilitate envelopment and are necessarily provided in sufficient number to ensure that every cell is vented.

The following description, in which reference is made to the accompanying diagrammatic drawing, is given in order to illustrate the invention.

In the drawing:
FIGURE 1 illustrates a piece of the protective material, and
FIGURE 2 illustrates a manner in which the material of FIGURE 1 may be employed.

The material of FIGURE 1 consists of a slice of honeycomb material formed from non-resinated paper of postcard thickness formed at face 1 with a deep notch 2. Face 1 is constituted by edges of the paper and exhibits the ends of the adhesive bands 3. In FIGURE 1, the width dimension W, the thickness of the paper and the width of the bands are all exaggerated for clarity of illustration.

To envelop an article such as a near-spherical glass lamp-shade, the material is expanded in the direction of the arrows A and its ends are clipped or otherwise joined together to form a substantially cylindrical shell with the notch 2 extending circumferentially around the inner face, the line of join being shown at 4 in FIGURE 2.

By compressing the shell axially, it is caused to bulge outwardly at the centre to give the form illustrated in FIGURE 2. The material in the circumferential zone Z, corresponding with the notch is distorted. To permit insertion of the article, the end 5 of the bulged shell is expanded, e.g. to the extent shown by the lines 6; after insertion end 5 contracts and the material stretches over the surface of the article to provide a substantially-fitting protective cover.

Where necessary, the fit may be improved by providing additional notches in face 1. Articles of more complex shape may be treated by providing notches in appropriate positions ascertained, if necessary, by experiment.

In the prior application of honeycomb material for similar purposes, the stack has been cut to give curved slices which adopt a globular form when expanded. Attractive results have been obtained but the method is uneconomic in view of the cutting losses involved and the need to relate the size and shape of the slices to the size and shape of particular articles. In contrast the straight slices with which the invention is concerned are obtained without cutting losses and are moreover applicable whatever the size and shape of the articles to be packed. Never before has it been considered feasible to form straight slices to complex shapes in this manner.

It is within the scope of the invention to provide articles of which the envelopment is an essential constituent part. For example by enveloping a cage of wire mesh, used as the "article," and covering the enveloped cage with a waterproof skin of treated fabric or plastic film, small expendable buoys can be produced in a simple and economic manner.

I claim:
1. A shock protective material for protecting articles by envelopment which comprises a straight slice of structural honeycomb material formed in at least one face which is formed by edges of the constituent sheet material with at least one notch positioned and dimensioned to permit the slice to be expanded and formed into enveloping relationship with the article, said sheet edges at said one face being free for positioning substantially radially outwardly of the longitudinal axis within the expanded slice with the edges on opposite sides of said notch arranged at a substantial angle to one another when said slice is in enveloping relationship.

2. A shock protective material for protecting articles by envelopment which comprises a circumferentially expandable sleeve of structural honeycomb material, said sleeve being formed on its inner surface with at least one deep circumferential notch and the portions of the inner surface of said sleeve on opposite sides of said slot being arranged at an angle to the longitudinal axis of said sleeve whereby the length of said sleeve is greater in unexpanded form than in expanded form.

3. A globular article having, as a shock protective envelopment, a straight slice of structural honeycomb material formed over its surface in enveloping relationship therewith said slice being formed with at least one notch arranged to surround the article and allow the honeycomb material to accommodate itself to the article by localised distortion of the cellular structure of the honeycomb material, the edge portions of said honeycomb slice on opposite sides of said notch being movable from straight alignment with one another when said honeycomb is unexpanded to misalignment when said slice is formed in enveloping relationship whereby the overall length of said honeycomb material in shock protective envelopment is less than the length of said slice.

References Cited by the Examiner

UNITED STATES PATENTS

| | | |
|---|---|---|
| 2,142,894 | 1/1939 | Grigg. |
| 2,728,479 | 12/1955 | Wheeler _____ 206—46 X |
| 3,017,019 | 1/1962 | Cahill _____ 206—46 |

LOUIS G. MANCENE, *Primary Examiner.*